United States Patent
Son et al.

(10) Patent No.: US 9,282,586 B2
(45) Date of Patent: Mar. 8, 2016

(54) METHOD AND APPARATUS FOR PERFORMING TCP COMMUNICATION IN A WIRELESS COMMUNICATION SYSTEM

(71) Applicant: Samsung Electronics Co., Ltd., Suwon-si, Gyeonggi-do (KR)

(72) Inventors: Yeong-Moon Son, Yongin-si (KR); Ki-Suk Kweon, Suwon-si (KR); Jung-Shin Park, Seoul (KR); Antony Franklin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

(21) Appl. No.: 14/174,184

(22) Filed: Feb. 6, 2014

(65) Prior Publication Data

US 2014/0226548 A1    Aug. 14, 2014

(30) Foreign Application Priority Data

Feb. 13, 2013 (KR) ......................... 10-2013-0015421

(51) Int. Cl.
*G08C 17/00* (2006.01)
*H04W 76/04* (2009.01)
*H04W 60/00* (2009.01)
*H04W 52/02* (2009.01)
*H04W 68/00* (2009.01)

(52) U.S. Cl.
CPC ........ *H04W 76/045* (2013.01); *H04W 52/0222* (2013.01); *H04W 60/00* (2013.01); *H04W 68/00* (2013.01)

(58) Field of Classification Search
CPC ................................................... H04W 76/045
See application file for complete search history.

(56) References Cited

U.S. PATENT DOCUMENTS

| | | | |
|---|---|---|---|
| 6,212,175 B1 | 4/2001 | Harsch | |
| 7,461,173 B2 | 12/2008 | Sen et al. | |
| 2004/0062267 A1 | 4/2004 | Minami et al. | |
| 2009/0248878 A1 | 10/2009 | Tran et al. | |
| 2011/0151944 A1 | 6/2011 | Morgan | |
| 2011/0213820 A1* | 9/2011 | Morris | 709/201 |
| 2012/0106423 A1 | 5/2012 | Nylander et al. | |

FOREIGN PATENT DOCUMENTS

EP        0 999 673 A2    5/2000

* cited by examiner

*Primary Examiner* — Maharishi Khirodhar
(74) *Attorney, Agent, or Firm* — Jefferson IP Law, LLP

(57) ABSTRACT

A method and an apparatus for performing Transmission Control Protocol (TCP) communication at a network node in a wireless communication system are provided. The method includes receiving, by the network node that connects between a Mobile Station (MS) and a data network, a TCP KeepAlive packet for maintaining a TCP connection established between a correspondent node and the MS through the data network from the correspondent node, transmitting, by the network node, when it is determined that the MS is in an idle mode upon receiving the TCP KeepAlive packet, an acknowledgement packet in response to the TCP KeepAlive packet to the correspondent node, and transmitting, by the network node, indication information indicating the reception of the TCP KeepAlive packet to the MS.

34 Claims, 9 Drawing Sheets

METHOD AND APPARATUS FOR PERFORMING TCP COMMUNICATION IN A WIRELESS COMMUNICATION SYSTEM

CROSS-REFERENCE TO RELATED APPLICATION(S)

This application claims the benefit under 35 U.S.C. §119(a) of a Korean patent application filed on Feb. 13, 2013 in the Korean Intellectual Property Office and assigned Serial number 10-2013-0015421, the entire disclosure of which is hereby incorporated by reference.

TECHNICAL FIELD

The present disclosure relates to a wireless communication system. More particularly, the present disclosure relates to a method and apparatus for performing data communication by Transmission Control Protocol (TCP) in a wireless communication system.

BACKGROUND

Research has been conducted to provide various services at or above 100 Mbps to users and the services are under deployment as a $4^{th}$ Generation (4G) communication system. Particularly, support of high-speed services with mobility and Quality of Service (QoS) ensured is an active study area in a Broadband Wireless Access (BWA) communication system such as Wireless Local Area Network (WLAN) and Wireless Metropolitan Area Network (WMAN) systems.

Transmission Control Protocol (TCP)/Internet Protocol (IP) is widely used for reliable connectivity between two end users irrespective of the type of communication system. TCP/IP means that an IP layer and its overlying TCP layer are used. Besides the TCP layer, many other layers may exist above the IP layer. For example, packets generated in various protocols such as User Datagram Protocol (UDP), Internet Control Message Protocol (ICMP), Internet Group Management Protocol (IGMP), and Real-Time Protocol (RTP) are encapsulated by the IP protocol, prior to transmission.

If no process at either endpoint of a TCP connection transmits data to its peer node, nothing is exchanged between both TCP modules. Unless this TCP connection is controlled, the TCP connection may be left as it is for hours, days, or months. Therefore, even though a relay router has failed or re-reruns or a link is damaged and then recovered, the TCP connection is maintained as long as at least one of the hosts (i.e., end users) at both endpoints of the TCP connection does not re-run. This TCP connection serves as a kind of garbage, consuming system resources. In this context, TCP KeepAlive is used to prevent resource waste caused by unnecessary maintenance of a TCP connection.

In TCP KeepAlive, a TCP KeepAlive probe packet is transmitted to a TCP peer node in a predetermined cycle. If a TCP ACKnowledgment (ACK) is not received in response to the TCP KeepAlive probe packet, a TCP connection session is closed, that is, released. In general, a timer for TCP KeepAlive may be set to any time from 15 minutes to 2 hours.

If one of TCP end users is a Mobile Station (MS) that accesses an IP network through a wireless communication system, the MS may access the IP network through a Base Station (BS) and an Access Service Network GateWay (ASN-GW). In the absence of traffic transmitted/received via a radio interface for a predetermined time, the MS may switch to an idle mode and turns off a wireless module, thereby minimizing power consumption. A timer for idle mode is generally set to a smaller value than the timer for TCP KeepAlive.

If the timer for TCP KeepAlive expires after the MS enters the idle mode, a remote end user generates a KeepAlive packet and transmits the KeepAlive packet to an ASN-GW being a core entity of a Core Network (CN) to which the MS is connected through the IP network, without knowledge of the state of the MS. A BS of a radio access network pages the MS in response to a notification of the ASN-GW so that the KeepAlive packet may be transmitted to the MS. The MS performs network reentry to the BS in response to the paging, receives the KeepAlive packet, and replies the remote end user with an ACK packet. Subsequently, when a predetermined time elapses without packet transmission, the MS returns to the idle mode.

The network reentry involves many procedures for MS re-authentication, Layer 1 (L1)/Layer 2 (L2) resource reallocation, and reconfiguration of a radio connection. Accordingly, network reentry and paging performed just for TCP KeepAlive result in unnecessary resource consumption of related entities and radio interfaces.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for performing Transmission Control Protocol (TCP) KeepAlive in a wireless communication system.

Another aspect of the present disclosure is to provide a method and apparatus for preventing a Mobile Station (MS) from performing unnecessary paging and network reentry for TCP KeepAlive in a wireless communication system.

Another aspect of the present disclosure is to provide a method and apparatus for performing TCP KeepAlive on behalf of an MS by a node of a core network in a wireless communication system.

In accordance with an aspect of the present disclosure, a method for performing TCP communication at a network node in a wireless communication system is provided. The method includes receiving, by the network node that controls a connection between an MS and a data network, a TCP KeepAlive packet for maintaining a TCP connection established between a correspondent node and the MS through the data network from the correspondent node, determining whether the MS is in an idle mode in response to the reception of the TCP KeepAlive packet by the network node, if the MS is in the idle mode, transmitting an acknowledgement packet in response to the TCP KeepAlive packet to the correspondent node by the network node, and transmitting indication information indicating the reception of the TCP KeepAlive packet to the MS by the network node.

In accordance with another aspect of the present disclosure, a method for performing TCP communication at a network node in a wireless communication system is provided. The method includes receiving, by the network node that controls a connection between an MS and a data network, a location update request message including indication information for TCP KeepAlive from the MS in an idle mode, transmitting a TCP KeepAlive packet to a correspondent node that establishes a TCP connection with the MS through the data network in response to the indication information by the network node, receiving a response to the TCP KeepAlive packet from the correspondent node by the network node, and transmitting a location update response message including response information indicating a result of the transmission of the TCP KeepAlive packet to the MS by the network node.

In accordance with another aspect of the present disclosure, a method for performing Transmission Control Protocol (TCP) communication at a Mobile Station (MS) in a wireless communication system is provided. The method includes, if a timer for TCP KeepAlive for a TCP connection established between the MS in an idle mode and a correspondent node through a data network expires, transmitting a location update request message including indication information for TCP KeepAlive to a network node that controls a connection between the MS and the data network, receiving a location update response message including response information indicating a TCP KeepAlive result from the network node, and, if the response information indicates successful reception of an acknowledgement packet for TCP KeepAlive from the correspondent node at the network node, resetting the timer for TCP KeepAlive.

In accordance with another aspect of the present disclosure, a network node for controlling a connection between an MS and a data network in a wireless communication system is provided. The network node includes a network interface configured to receive a TCP KeepAlive packet for maintaining a TCP connection established between a correspondent node and the MS through the data network from the correspondent node and to transmit an acknowledgement packet in response to the TCP KeepAlive packet to the correspondence node, and a controller configured to determine whether the MS is in an idle mode in response to the reception of the TCP KeepAlive packet, to control, if the MS is in the idle mode, the network interface to transmit an acknowledgment packet in response to the TCP KeepAlive packet to the correspondent node, and to control the network interface to transmit indication information indicating the reception of the TCP KeepAlive packet to the MS.

In accordance with another aspect of the present disclosure, a network node for controlling a connection between an MS and a data network in a wireless communication system is provided. The network node includes a network interface configured to receive a location update request message including indication information for TCP KeepAlive from the MS in an idle mode, to transmit a TCP KeepAlive packet to a correspondent node that establishes a TCP connection with the MS through the data network in response to the indication information, and to receive a response to the TCP KeepAlive packet from the correspondent node, and a controller configured to, upon receipt of a response to the TCP KeepAlive packet, control the network interface to transmit a location update response message including response information indicating a result of the transmission of the TCP KeepAlive packet to the MS.

In accordance with another aspect of the present disclosure, an MS for performing TCP communication in a wireless communication system is provided. The MS includes a controller configured to, if a timer for TCP KeepAlive for a TCP connection established between the MS in an idle mode and a correspondent node through a data network expires, generate indication information for TCP KeepAlive, and a radio interface configured to transmit a location update request message including the indication information to a network node that controls a connection between the MS and the data network and to receive a location update response message including response information indicating a TCP KeepAlive result from the network node. If the response information indicates successful reception of an acknowledgement packet for TCP KeepAlive from the correspondent node at the network node, the controller resets the timer for TCP KeepAlive.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The following description will be given of embodiments of the present disclosure intended to support Transmission Control Protocol (TCP) KeepAlive for a Mobile Station (MS) that accesses an Internet Protocol (IP) network through a radio access network and uses TCP/IP.

Figure 1:
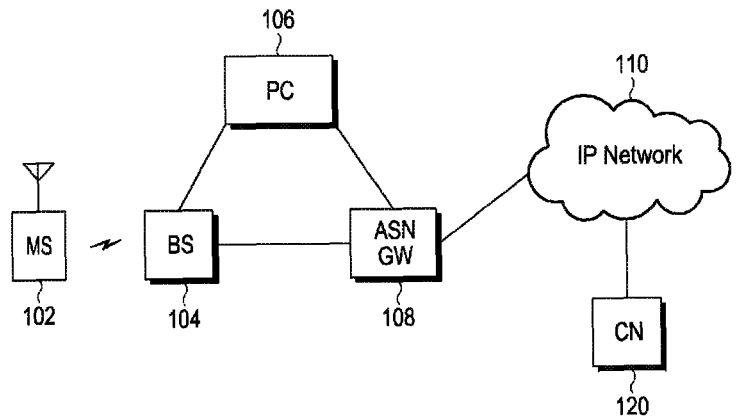
FIG. 1 illustrates a simplified configuration of a wireless communication system to which the present disclosure is applied according to the related art.

FIG. 1 illustrates a simplified configuration of a wireless communication system to which the present disclosure is applied according to the related art.

Referring to FIG. 1, an MS 102 accesses a BS 104 of a radio access network via a radio interface. The radio interface may conform to, for example, World Interoperability for Microwave Access (WiMAX), 3rd Generation Partnership Project (3GPP), Long Term Evolution (LTE), or the like. The BS 104 connects the MS 102 to an IP network 110 being a public data network through a core entity of a core network, for example, an Access Service Network GateWay (ASN-GW) 108 of the core network. A Paging Controller (PC) 106 manages a state of the MS 102 and, when needed, pages the MS 102, in conjunction with a location server (not shown) of an operator network.

The ASN-GW 108 may be connected to the IP network 110 directly or through another core entity such as a Packet GateWay (P-GW) (not shown). The ASN-GW 108 is a first entity to receive an IP packet directed to the MS 102 in the core network.

The MS 102 may conduct IP communication with a Correspondence Node (CN) 120 over the IP network 110, and various protocols may exist above an IP layer. The type of a protocol existing at the IP layer is indicated by an IP header included in an IP packet.

Figure 2:
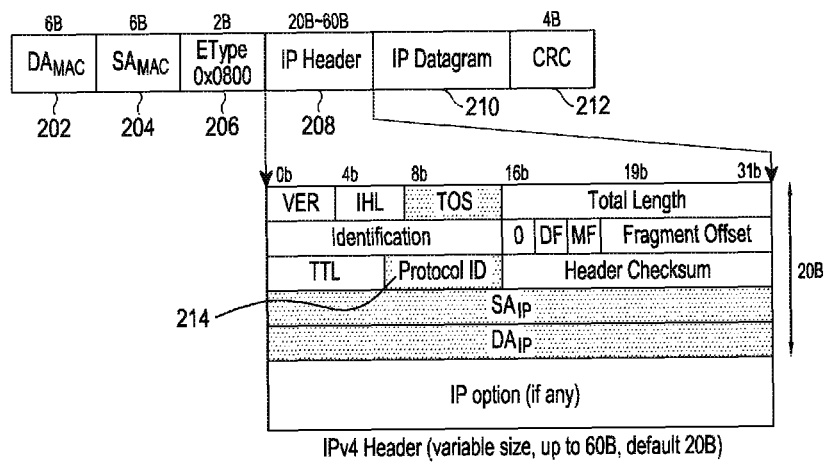
FIG. 2 illustrates an Internet Protocol (IP) packet format according to an embodiment of the present disclosure.

FIG. 2 illustrates an IP packet format according to an embodiment of the present disclosure.

Referring to FIG. 2, an IP packet 200 includes Destination Address (DA) 202 indicating a Medium Access Control (MAC) address of a receiver, Source Address (SA) 204 indicating a MAC address of a sender, EType 206 indicating an IP version (IP version 4 (IPv4) or IP version 6 (IPv6)), IP Header 208, IP Datagram 210, and Cyclic Redundancy Checked (CRC) 212.

The IP Header 208 includes Version (VER) indicating a version number (IPv4 or IPv6) of the IP Header 208, Internet Header Length (IHL) indicating the size of the IP Header 208, Type of Service (ToS) indicating service quality of the transmitted IP packet 200, Total Length indicating the total length of the IP Header 208 and the IP Datagram 210 in octets, Identification referred to by a higher layer, Don't Fragment (DF) and More Fragments (MF) which are flags indicating packet fragmentation-related control, Fragment Offset indicating a fragmentation interval, Time To Live (TTL) indicating a valid time over which the IP packet 200 may stay in the network, Protocol ID 214, Header Checksum, Source IP Address (SA) indicating an IP address of the sender, Destination IP Address (DA) indicating an IP address of the receiver, and IP options supporting a variable length.

The 8-bit Protocol ID 214 indicates a layer that generates a packet above the IP layer. If Protocol ID=1, this indicates Internet Control Message Protocol (ICMP), and if Protocol ID=2, this indicates Internet Group Management Protocol (IGMP).

Figure 3A:
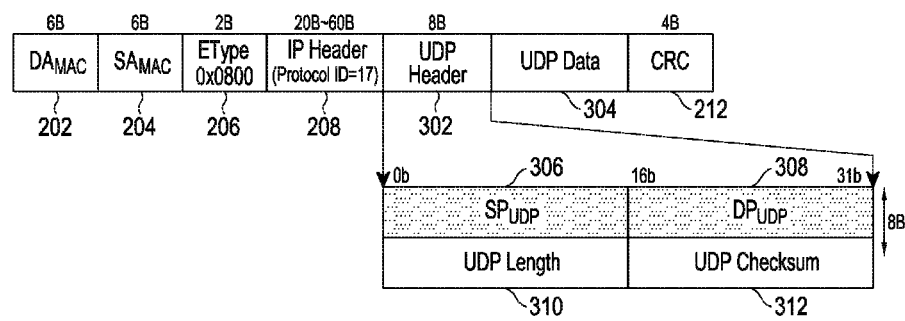
FIG. 3A illustrates a User Datagram Protocol/Internet Protocol (UDP/IP) packet format according to an embodiment of the present disclosure.

FIG. 3A illustrates a UDP/IP packet format according to an embodiment of the present disclosure.

Referring to FIG. 3A, a UDP/IP packet 300 includes UDP Header 302 and UDP Data 304 in the IP Datagram field 210 shown in FIG. 2. The UDP Header 302 includes Source Port number (SP) 306 indicating a UDP source port number, Destination Port number (DP) 308 indicating a UDP destination port number, UDP Length 310 indicating the total length of the UDP Header 302 and the UDP Data 304, and UDP Checksum 312.

If Protocol ID=6, this means that a TCP layer above the IP layer generates the IP packet 200. In this case, a TCP packet is included in the IP Datagram field 210.

Figure 3B:
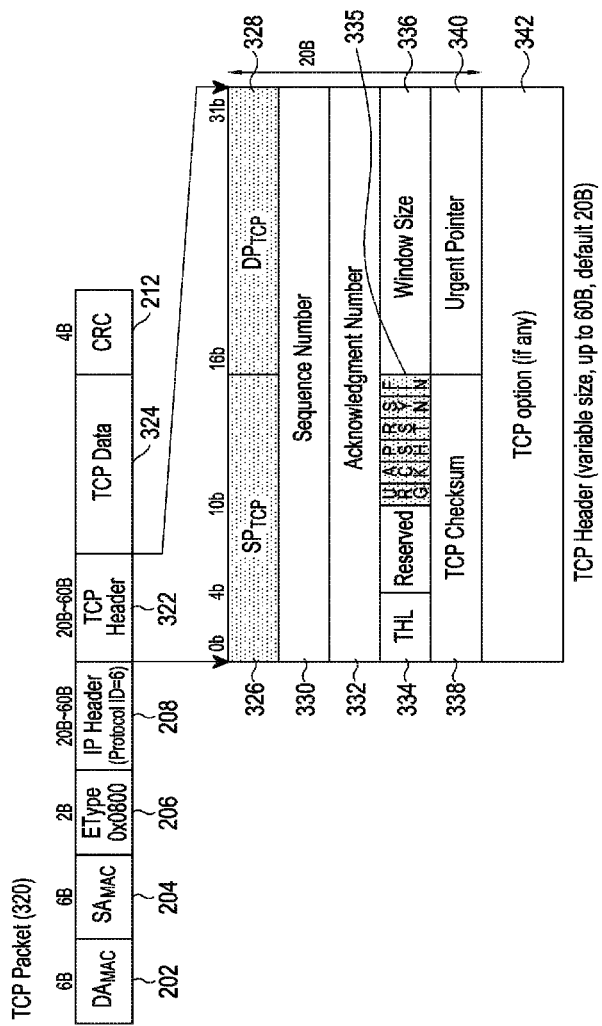
FIG. 3B illustrates a Transmission Control Protocol/Internet Protocol (TCP/IP) packet format according to an embodiment of the present disclosure.

FIG. 3B illustrates a TCP/IP packet format according to an embodiment of the present disclosure.

Referring to FIG. 3B, a TCP/IP packet 320 includes TCP Header 322 and TCP Data 324 in the IP Datagram field 210 shown in FIG. 2. The TCP Data 324 may be omitted depending on the circumstances. The TCP Header 322 includes SP 326 indicating a TCP source port number, DP 328 indicating a TCP destination port number, Sequence Number 330, Acknowledgment Number 332, TCP Header Length (THL) 334, control flags 335 used to control TCP connection and termination, Window Size 336, TCP Checksum 338, Urgent Pointer 340, and TCP options 342.

A TCP session between end users is identified by the SP 326 and the DP 328. That is, TCP sessions of an IP connection using the same IP address are transmitted or received to or from a higher-layer application program by source/destination port numbers. The SP 326 identifies a source application program. At an initial connection attempt (SYN=1), the SP 326 is generated randomly. Unlike UDP, the source port number may not be 0 in TCP. Accordingly, the SP 326 may range from 1 to 65535.

The DP 328 identifies a destination application program. At an initial connection attempt (SYN=1), the DP 328 is generated randomly. The DP 328 may also range from 1 to 65535.

The Sequence Number 330 specifies the sequence of transmitted data. The Sequence Number 330 is increased by 1 for each 1-byte data. If the Sequence Number 330 exceeds $2^{32}$, the Sequence Number 330 may be reset.

The Acknowledgment Number 332 indicates the byte position of received data, which is set to (the sequence number of the position of completely received data+1). When an ACK flag is 1 (e.g., ON), the Acknowledgment Number field 332 is used.

The THL 334 indicates the starting position of the TCP Data 324. Since the TCP Data 324 follows the TCP Header 322, the THL 334 may be interpreted as indicating the size of the TCP Header 322.

The TCP control flags 335 include Urgent (URG), ACK, Push (PSH), Reset (RST), Synchronization Number (SYN), and Finish (FIN). The URG is a flag indicating inclusion of urgent data, indicating that the following Urgent Pointer 340 is valid. For example, when an interrupt command is transmitted, the URG may be used. The ACK is a flag indicating inclusion of a valid ACK number in the TCP header 322. In TCP 3-way handshake, the ACK flags of all TCP packets except for an initial TCP packet are set to 1 (e.g., ON). The PSH is a flag requesting immediate transfer of received data to an application program. Thus the TCP layer immediately transmits the TCP packet to a higher-layer process in response to the PSH flag.

The RST is a flag set when the TCP connection is to be terminated or rejected. One TCP end user may force termination of an ongoing TCP connection by transmitting a TCP packet with RST set to 1 (e.g., ON). The SYN is a flag used to synchronize the ACK number, when both end users set the SYN to 1 (e.g., ON) in TCP 3-way handshake. The FIN is a flag set to close a TCP connection. If both end users transmit the FIN flag, the TCP connection is closed.

The Window Size 336 indicates a maximum buffer size for a current state. The receiver may indicate a receivable data size to the transmitter by the Window Size field 336. The Urgent Pointer 340 is valid only when the URG flag is 1. The Urgent Pointer 340 indicates the last byte position of data to be handled urgently.

Figure 4:
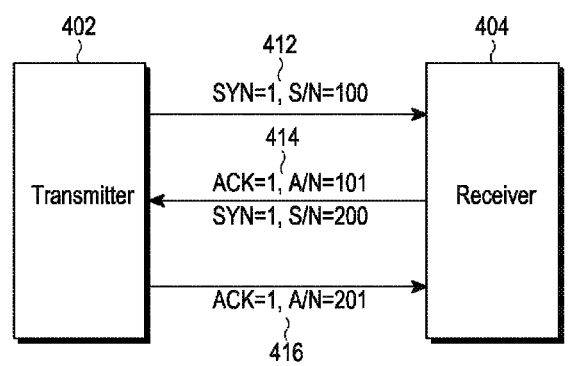
FIG. 4 illustrates a simplified procedure for opening a TCP session between end users by TCP 3-way handshake according to an embodiment of the present disclosure.

FIG. 4 illustrates a simplified procedure for opening a TCP session between end users by TCP 3-way handshake according to an embodiment of the present disclosure.

Referring to FIG. 4, a transmitter 402 being a transmitting host requests a receiver 404 to synchronize Sequence Number to 100 by transmitting a sync packet with [SYN=1, ACK=0, Sequence Number=100] in operation 412. In operation 414, the receiver 404 transmits an ACK/sync packet with [SYN=1, Sequence Number=200, ACK=1, Acknowledgment Number=101] to the transmitter 402 in response to the sync packet. The ACK/sync packet indicates successful reception of the packet with Sequence Number=100 transmitted by the transmitter 402 and requests transmission of a packet with Sequence Number=101 and synchronization of Sequence Number to 200. Thus, TCP synchronization is acquired between the transmitter 402 and the receiver 404. In operation 416, the transmitter 402 transmits an ACK packet with [ACK=1, Acknowledgment Number=201] to the receiver 404. The ACK packet indicates successful reception of the packet with Sequence Number=200 transmitted by the receiver 404 (i.e., the packet transmitted in operation 414) and waiting for a packet with Sequence Number=201.

Figure 5:
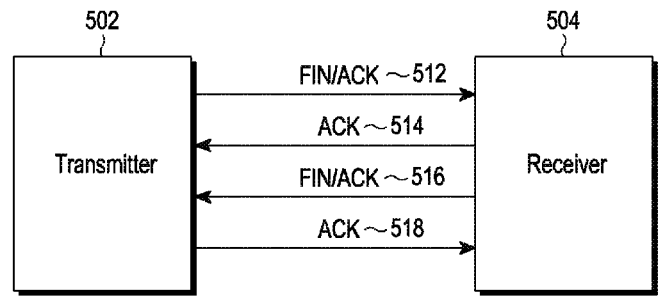
FIG. 5 illustrates a simplified procedure for closing a TCP session between end users by TCP 4-way handshake according to an embodiment of the present disclosure.

FIG. 5 illustrates a simplified procedure for closing a TCP session between end users by TCP 4-way handshake according to an embodiment of the present disclosure.

Referring to FIG. 5, a transmitter 502 transmits a segment packet with [FIN=1, ACK=0, Sequence Number=J] to a receiver 504 to indicate termination of a TCP connection in operation 512. In operation 514, the receiver 504 transmits a segment packet with [ACK=1, Acknowledgment Number=J+1] to confirm the request of the transmitter 502. Herein, a connection directed from the transmitter 502 to the receiver 504 is terminated but a reverse connection is still maintained. Therefore, the receiver 504 may continue to transmit data to the transmitter 502.

In operation 516, the receiver 504 completes its transmission and transmits a segment packet with [FIN=1, ACK=1, Acknowledgment Number=J+1, Sequence Number=K] to the transmitter 502 to indicate release of the TCP connection. The transmitter 502 completely terminates the TCP connection by transmitting an ACK packet with [ACK=1] in response to the request of the receiver 504 in operation 518.

If a TCP connection is maintained between both end users of the TCP connection and no process of either end user transmits data to the other end user, the TCP connection may be left as it is for hours, days, or months, thereby wasting resources. To prevent the resource waste, TCP KeepAlive is performed.

One of main purposes of TCP KeepAlive is to detect a dead peer. That is, when one of end users is dead, TCP KeepAlive is used to handle a one-way open connection state. Specifically, if a remote node is dead during TCP communication, a local node still opens a TCP connection and the dead remote node closes the TCP connection. Unless a network application program sets a timeout value or a TCP KeepAlive socket option, the above state is maintained, consuming resources until the local node is rebooted. TCP KeepAlive checks this state and closes an unnecessary session of the TCP connection, thereby preventing unnecessary resource consumption.

In addition, TCP KeepAlive may be used to prevent disconnection caused by network inactivity. If a network node such as a Network Address Translation (NAT) proxy, a firewall, or a general server has not received a packet for a predetermined time, the network node may release a related session. To prevent the session release, TCP KeepAlive is used for periodic packet transmission.

For TCP KeepAlive, a TCP KeepAlive probe packet is used. The TCP KeepAlive probe packet includes [ACK=1, Sequence Number=SDN.NXT−1] and a data field with no data or 1-byte garbage data. SND.NXT represents the next sequence number for transmission. Since SND.NXT is equal to RCV.NXT indicating the next sequence number expected for reception, SND.NXT−1 may be outside a window range.

An end user may transmit a TCP KeepAlive probe packet according to TCP connection information set by an application program. A transmission interval and a transmission period of the TCP KeepAlive probe packet may be changed according to TCP connection information set by the application program. If a related TCP session is valid, a TCP CN that has received the TCP KeepAlive probe packet transmits a TCP ACK packet with [ACK=1] and resets an internal timer used to determine when to transmit its TCP KeepAlive probe packet. On the contrary, if the related TCP session is not valid, the TCP CN transmits an RST packet [RST=1] so that the end user transmitting the TCP KeepAlive probe packet may terminate the TCP session.

Figure 6:
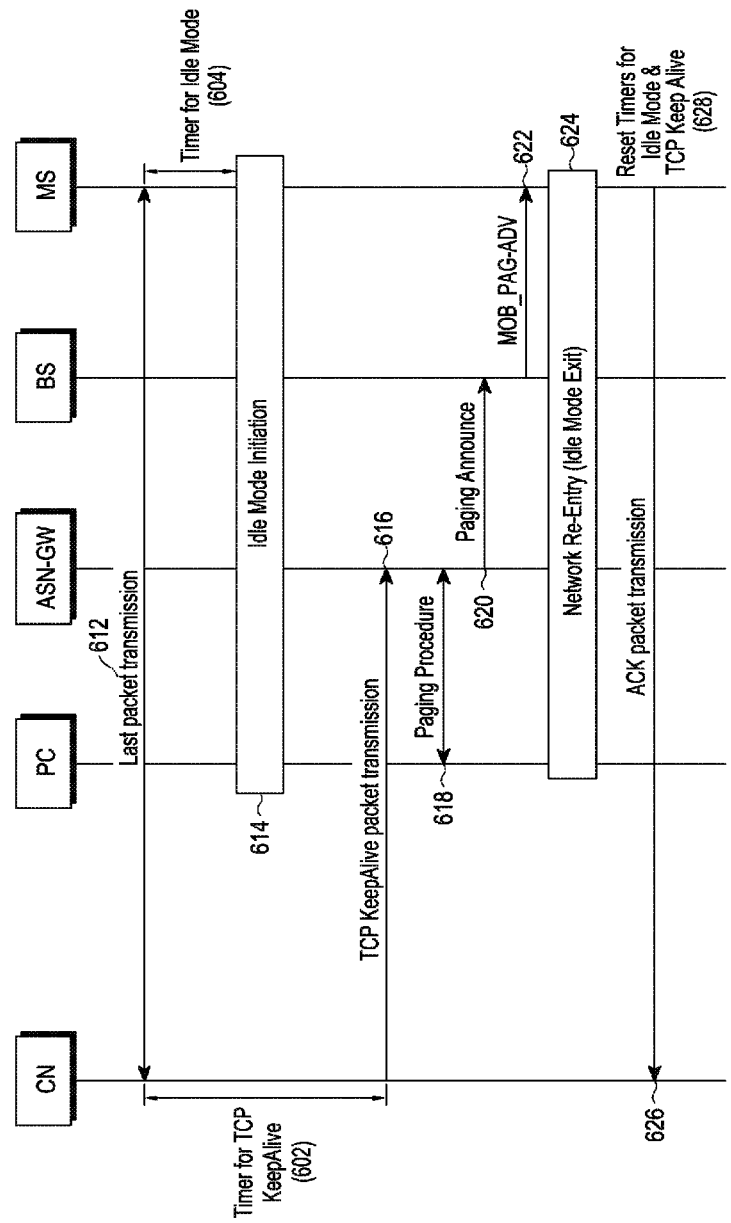
FIG. 6 is a diagram illustrating a signal flow for a KeepAlive procedure for an idle-mode Mobile Station (MS) according to an embodiment of the present disclosure.

FIG. 6 is a diagram illustrating a signal flow for a KeepAlive procedure for an idle-mode MS according to an embodiment of the present disclosure.

Referring to FIG. 6, an MS exchanges packets with a CN via a TCP connection through a BS, an ASN-GW, and an IP network (not shown). The MS resets a timer 604 for idle mode after exchanging a last packet with the CN via a radio interface in operation 612. When the timer 604 for idle mode expires, the MS performs a procedure for entering the idle mode with a paging controller in operation 614. If the MS successfully enters the idle mode, the paging controller notifies the ASN-GW of the successful switching of the MS to the idle mode and thus the ASN-GW is aware that the MS has entered the idle mode. Subsequently, upon receipt of a packet via a connection associated with the MS, the ASN-GW notifies the paging controller of the reception of the packet. The CN also starts a timer 602 for TCP KeepAlive after exchanging the last packet with the MS via the TCP connection in operation 612. The timer 602 for TCP KeepAlive is set to a value longer than the timer 604 for idle mode. Therefore, if the timer 602 for TCP KeepAlive expires after the MS switches to the idle mode, the CN generates a TCP KeepAlive packet (i.e., a TCP KeepAlive probe packet) directed to the MS, without knowledge of the MS being placed in the idle mode in operation 616.

The TCP KeepAlive packet is transmitted to the ASN-GW through a P-GW (not shown) over the IP network. The ASN-GW is aware that the MS being a destination of the TCP KeepAlive packet is in the idle mode. Thus the ASN-GW performs a paging procedure with the paging controller to wake up the idle-mode MS in operation 618 and transmits a Paging Announce message for the MS to a BS (and neighbor BSs) in which the MS is finally located in operation 620. In operation 622, the BS (or the BSs) broadcasts a Mobile Paging Advertisement (MOB_PAG-ADV) message to page the MS. The MS performs network reentry to the BS in response to the MOB_PAG-ADV message in operation 624. The ASN-GW transmits the TCP KeepAlive packet to the MS through the BS, recognizing that the MS has switched from the idle mode by the network reentry.

In operation 626, the MS transmits an ACK packet to the CN in response to the TCP KeepAlive packet in order to maintain the TCP connection. After transmitting the ACK packet, the MS resets the timer 604 for idle mode in operation 628. If the timer 604 for idle mode expires, the MS switches to the idle mode. In addition, since a packet for a TCP connection has been generated, the MS resets a timer for TCP KeepAlive.

To prevent unnecessary paging and network reentry procedures simply for TCP KeepAlive as described above, an entity of a core network, for example, an ASN-GW responds to TCP KeepAlive on behalf of an MS and notifies the MS of the behavior of the ASN-GW in an embodiment of the present disclosure.

Figure 7:
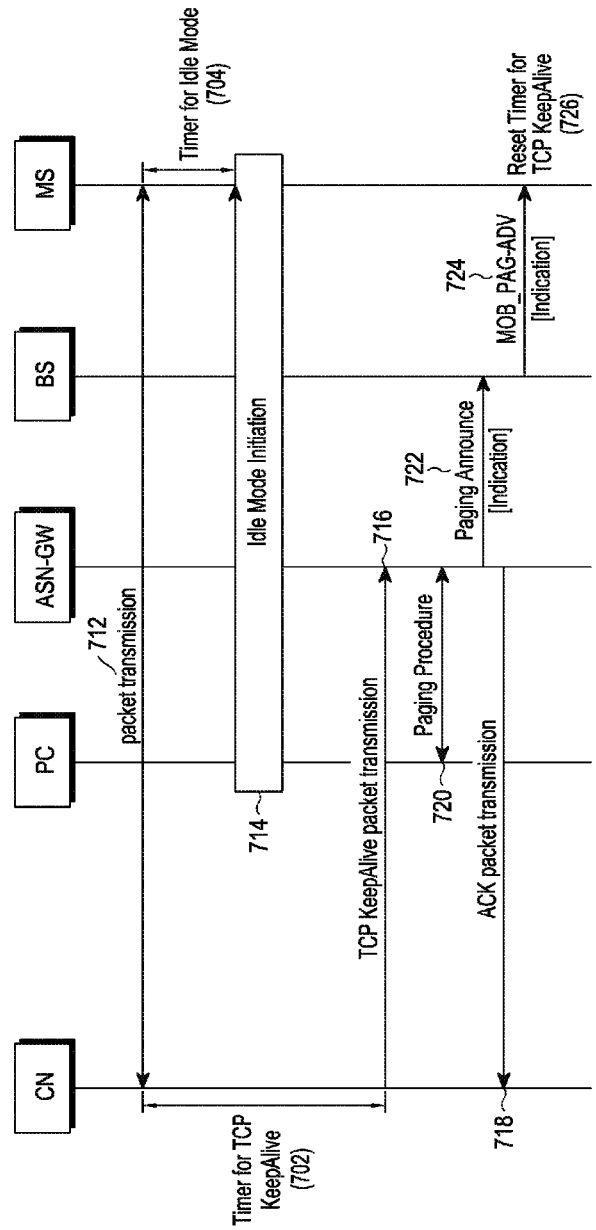
FIG. 7 is a diagram illustrating a signal flow for a KeepAlive procedure of a network node according to an embodiment of the present disclosure.

FIG. 7 is a diagram illustrating a signal flow for a KeepAlive procedure of a network node according to an embodiment of the present disclosure. In the illustrated case of FIG. 7, a network node is an entity of a core network, for example, an ASN-GW.

Referring to FIG. 7, an MS exchanges packets with a CN via a TCP connection through a BS, an ASN-GW, and an IP network (not shown). Each time the MS exchanges a packet via a radio interface in operation 712, the MS resets a timer 704 for idle mode. When the timer 704 for idle mode expires with no further packet exchange, the MS performs a procedure for entering the idle mode with a paging controller in operation 714.

Also, each time the CN exchanges a packet with the MS via the TCP connection in operation 712, the CN starts a timer 702 for TCP KeepAlive. When the timer 702 expires for TCP KeepAlive with no further packet transmission, the CN generates a TCP KeepAlive packet (i.e., a TCP KeepAlive probe packet) directed to the MS in operation 716. The TCP KeepAlive packet is transmitted to the ASN-GW through a P-GW (not shown) over the IP network.

The ASN-GW checks an ACK flag and a data field of the TCP packet received from the IP network. If the ACK flag is 1 and the data field includes no data or only 1-byte garbage data, the ASN-GW determines that the TCP packet is a TCP KeepAlive packet. Upon receipt of the TCP KeepAlive packet, the ASN-GW determines whether the MS being a destination of the TCP KeepAlive packet is in the idle mode. If the MS is not in the idle mode, the ASN-GW directly transmits the TCP KeepAlive packet to the MS. On the contrary, if the MS is in the idle mode, the ASN-GW directly generates an ACK packet in response to the TCP KeepAlive packet and transmits the ACK packet to the CN in operation 718. That is, the ASN-GW generates the ACK packet as a response for TCP KeepAlive on behalf of the MS. While operation 718 is described as taking place after operations 720 and 722, operation 718 may be performed at any time after operation 716, preferably immediately after operation 716.

While not shown, if the MS does not normally perform an idle-mode operation such as timer-based location update or the MS performs a deregistration procedure and thus information about the MS is not valid any longer, the ASN-GW may generate an RST packet instead of an ACK packet in response to the TCP KeepAlive packet and reply to the CN with the RST packet. In this case, the CN terminates (deletes) a TCP session for the MS, upon determining that the TCP session may not be maintained any longer.

Because a TCP session is an end-to-end connection, the ASN-GW performs a paging procedure for the MS with the paging controller to notify the MS that the ASN-GW has intercepted the connection between the MS and the CN in operation 720 and transmits a Paging Announce message to a BS(s) neighboring to the MS in operation 722. The Paging Announce message includes indication information indicating arrival of the TCP KeepAlive message for the TCP session. The indication information may include, for example, an indication of KeepAlive packet arrival, an IP address of the CN, and a destination TCP port number. In another embodiment of the present disclosure, if TCP sessions are mapped to MAC service flows in a one-to-one correspondence and thus a TCP session may be identified just by an ID of a MAC service flow, the indication information may include a Service Flow ID (SFID) identifying a service flow associated with the TCP session, if the service flow exists in the MS.

In operation 724, the BS (or the BSs) generates a paging message, that is, a MOB_PAG-ADV message based on the indication information and broadcasts the MOB_PAG-ADV message. The MOB_PAG-ADV message includes indication information for TCP KeepAlive along with a parameter identifying the MS, that is, a MAC address hash value of the MS. For example, Action Code of the MOB_PAG-ADV message may be set to 0b11 indicating KeepAlive packet, for use as the indication information. If the Action Code of the MOB PAG-ADV message is 0b11, the MOB_PAG-ADV message may include additional indication information such as the IP address of the CN and the destination TCP port number, to thereby indicate a TCP session for which the TCP KeepAlive packet has been received by the MS.

In operation 726, the MS identifies a TCP session indicated by the indication information included in the MOB_PAG-ADV message and resets a timer for TCP KeepAlive related to the TCP session. Despite reception of the MOB_PAG-ADV message, the MS may be kept in the idle mode without performing a paging procedure. This is possible because the MS is aware based on the indication information that the MOB_PAG-ADV message is not for paging but for TCP KeepAlive.

Thus, the MS may keep the timer for TCP KeepAlive without unnecessary paging and network reentry, rather than the MS receiving a paging message, performing network reentry, receiving a TCP KeepAlive packet from the network/ the BS, and resetting the timer.

If, upon receipt of the MOB PAG-ADV message, the MS determines that information about the TCP session indicated by the indication information included in the MOB_PAG-ADV message has been lost or has already been deleted due to a device reset or for any other reason, the MS may operate as follows. In an embodiment of the present disclosure, the MS performs network reentry in response to the MOB_PAG-ADV message and then transmits an RST packet to the CN. In another embodiment of the present disclosure, the MS may request the ASN-GW to transmit an RST packet to the CN on behalf of the MS.

In another embodiment of the present disclosure as described below, a BS may indicate a Location Update (LU) procedure to an MS by a paging message for TCP KeepAlive, rather than the BS including additional indication information in the paging message.

Figure 8:
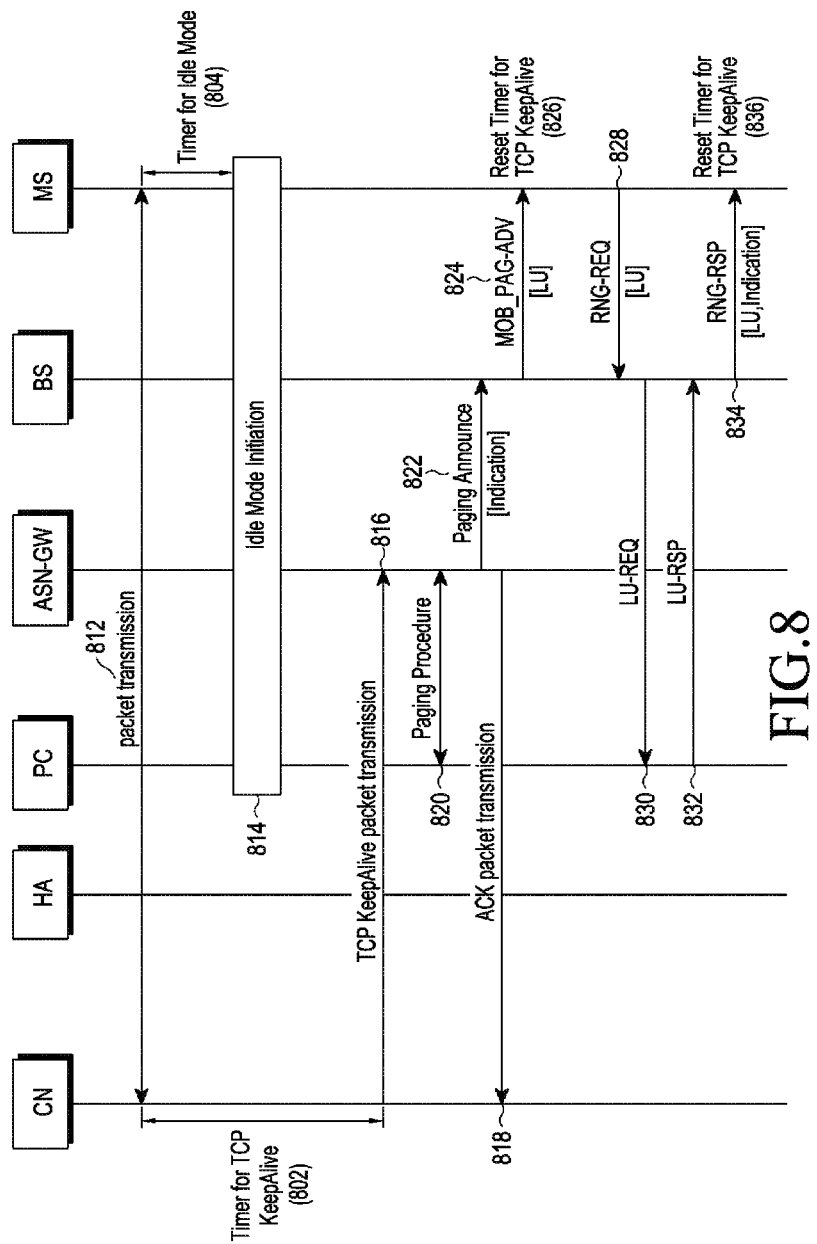
FIG. 8 is a diagram illustrating a signal flow for a KeepAlive procedure of a network node according to another embodiment of the present disclosure.

FIG. 8 is a diagram illustrating a signal flow for a KeepAlive procedure of a network node according to another embodiment of the present disclosure.

Referring to FIG. 8, an MS establishes a TCP connection with a CN through a BS, an ASN-GW, and an IP network (not shown) and exchanges packets with the CN via the TCP connection. Each time the MS exchanges a packet via a radio interface in operation 812, the MS resets a timer 804 for idle mode. When the timer 804 for idle mode expires with no further packet exchange, the MS performs a procedure for entering the idle mode with a paging controller in operation 814.

Each time the CN exchanges a packet with the MS via the TCP connection in operation 812, the CN also starts a timer 802 for TCP KeepAlive. When the timer 802 for TCP KeepAlive expires with no further packet transmission, the CN generates a TCP KeepAlive packet (i.e., a TCP KeepAlive probe packet) directed to the MS in operation 816. The TCP KeepAlive packet is transmitted to the ASN-GW through a P-GW (not shown) over the IP network.

Upon receipt of the TCP KeepAlive packet from the IP network, the ASN-GW determines whether the MS being a destination of the TCP KeepAlive packet is in the idle mode. If the MS is in the idle mode, the ASN-GW directly generates an ACK packet in response to the TCP KeepAlive packet and transmits the ACK packet to the CN in operation 818. That is, the ASN-GW generates the ACK packet as a response for TCP KeepAlive on behalf of the MS. While operation 818 is described as taking place after operations 820 and 822, operation 818 may be performed at any time after operation 816, preferably immediately after operation 816.

To notify the MS that the ASN-GW has intercepted the connection between the MS and the CN, the ASN-GW performs a paging procedure for the MS with the paging controller in operation 820 and transmits a Paging Announce message to a BS(s) neighboring to the MS in operation 822. The Paging Announce message includes indication information indicating paging for TCP KeepAlive. The indication information may include, for example, an indication of KeepAlive packet arrival, an IP address of the CN, and a destination TCP port number. In another embodiment of the present disclosure, if TCP sessions are mapped to MAC service flows in a one-to-one correspondence and thus a TCP session may be identified just by an ID of a MAC service flow, the indication information may include an SFID identifying a service flow associated with the TCP session, if the service flow exists in the MS.

In operation 824, the BS (or the BSs) generates a paging message, that is, a MOB_PAG-ADV message based on the indication information and broadcasts the MOB_PAG-ADV message. The MOB_PAG-ADV message includes indication information for location update along with a parameter identifying the MS, that is, a MAC address hash value of the MS. For example, Action Code of the MOB_PAG-ADV message may be set to 0b01 indicating location update, for use as the indication information.

In operation 828, the MS transmits a Ranging Request (RNG-REQ) message to the BS, requesting location update in response to the location update indication information included in the MOB_PAG-ADV message. For example, bit 2 of a ranging purpose indication may be set to '1' in the RNG-REQ message, indicating a location update request.

The MS may reset a timer for TCP KeepAlive in response to the MOB_PAG-ADV message indicating location update in operation 826.

In operation 830, the BS transmits an LU Request (LU-REQ) message to the paging controller in response to the RNG-REQ message received from the MS. The paging controller updates location information about the MS and then transmits an LU Response (LU-RSP) message to the BS in operation 832. The BS transmits a Ranging Response (RNG-RSP) message to the MS as a response to the location update request of the MS in operation 834.

The RNG-RSP message includes indication information indicating reception of the TCP KeepAlive packet for the MS from the CN. For example, the indication information includes an indication of KeepAlive packet arrival, an IP address of the CN, and a destination TCP port number. In another embodiment of the present disclosure, in the presence of a service flow related to the TCP session in the MS, the indication information may include an SFID identifying the service flow.

In operation 836, the MS identifies a TCP session indicated by the indication information included in the RNG-RSP message and resets the timer for TCP KeepAlive in relation to the TCP session.

In another embodiment of the present disclosure as described below, an idle-mode MS transmits a TCP KeepAlive packet (i.e., a TCP KeepAlive probe packet) to a CN. That is, the MS requests transmission of the TCP KeepAlive packet to an entity of a core network, for example, an ASN-GW by an LU procedure and the ASN-GW transmits the TCP KeepAlive packet to the CN on behalf of the MS, upon request of the MS.

Figure 9:
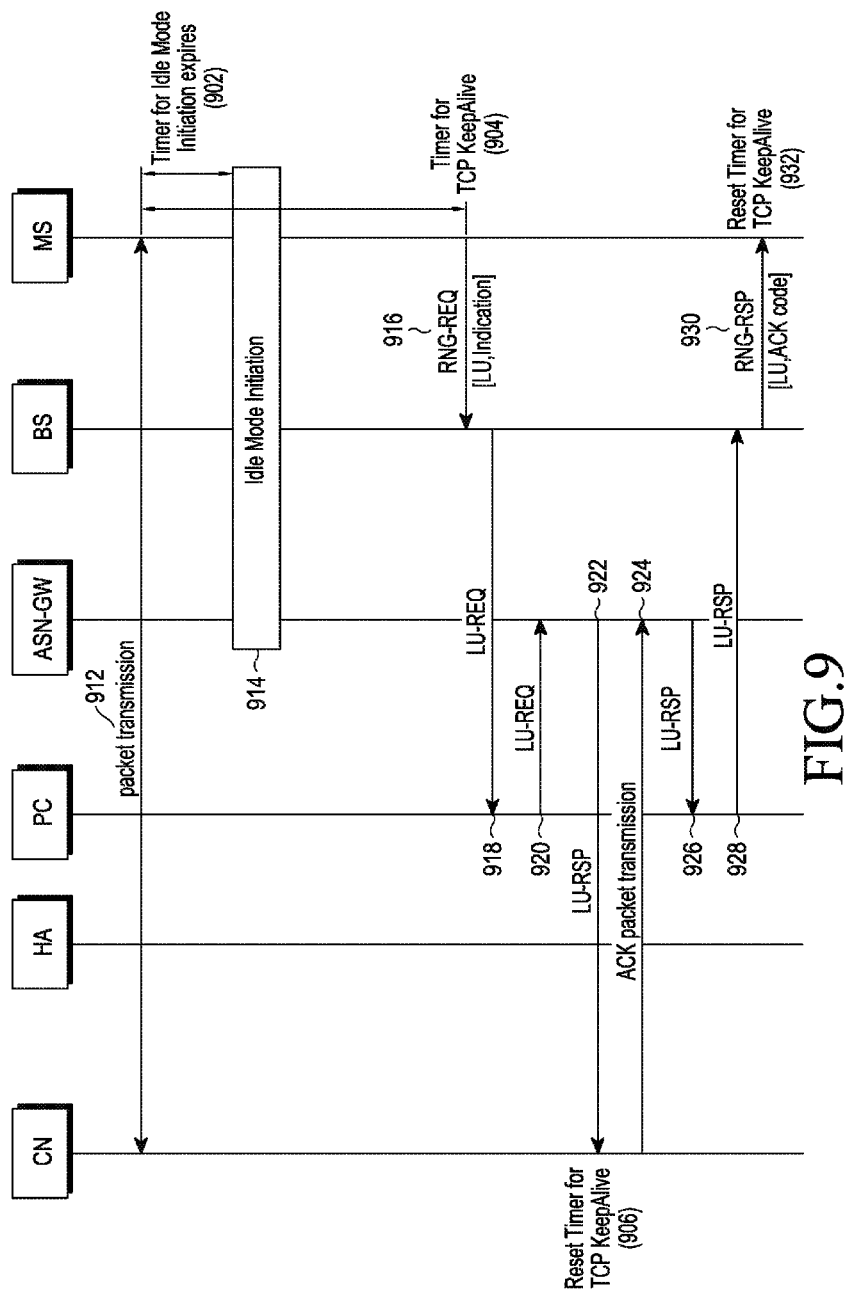
FIG. 9 is a diagram illustrating a signal flow for a KeepAlive procedure of a network node according to another embodiment of the present disclosure.

FIG. 9 is a diagram illustrating a signal flow for a KeepAlive procedure of a network node according to another embodiment of the present disclosure.

Referring to FIG. 9, an MS establishes a TCP connection with a CN through a BS, an ASN-GW, and an IP network (not shown) and exchanges packets with the CN via the TCP connection in operation 912. Each time the MS exchanges a packet via a radio interface in operation 912, the MS resets a timer 902 for idle mode. When the timer 902 for idle mode expires with no further packet exchange, the MS performs a procedure for entering the idle mode with a paging controller in operation 914. Each time the MS exchanges a packet via the TCP connection, the MS resets a timer 904 for TCP KeepAlive. When the timer 904 for TCP KeepAlive expires with no further packet transmission in the idle mode, the MS transmits an RNG-REQ message requesting location update to the BS, for TCP KeepAlive in operation 916. The MS may transmit the RNG-REQ message, maintaining the idle mode. In an embodiment of the present disclosure, bit 2 of a ranging purpose indication may be set to '1' in the RNG-REQ message, indicating a location update request.

In addition, the RNG-REQ message includes indication information for TCP KeepAlive. For example, the indication information includes request information requesting transmission of a TCP KeepAlive probe or an RST packet, an IP address of the CN, and a destination TCP port number. The request information refers to a parameter requesting transmission of a TCP KeepAlive probe or an RST packet. In another embodiment of the present disclosure, if a service flow related to the TCP session exists in the MS and TCP sessions are mapped to MAC service flows in a one-to-one correspondence, the indication information may further include an SFID indicating the service flow. For example, if the request information is 0x01, this means a request for transmitting a TCP KeepAlive probe packet on behalf of the MS. If the request information is 0x02, this means a request for transmitting an RST packet on behalf of the MS.

In operation 918, the BS receives the RNG-REQ message including the indication information and transmits an LU-REQ message including the indication information to the paging controller. The paging controller forwards the LU-REQ message to the ASN-GW in operation 920. The ASN-GW transmits a TCP KeepAlive packet to the CN on behalf of the MS in response to the request information (0x01) included in the LU-REQ message in operation 922. The CN resets a timer 906 for TCP KeepAlive in response to reception of the TCP KeepAlive packet and then transmits an ACK packet as a response for TCP KeepAlive to the ASN-GW in operation 924.

In operation 926, the ASN-GW forwards the LU-RSP message in response to the LU-REQ message to the paging controller. An ACK code indicating that the ASN-GW performs TCP KeepAlive on behalf of the MS may be included in the LU-RSP message.

The paging controller forwards the LU-RSP message to the BS in operation 928 and the BS transmits an RNG-RSP message in response to the RNG-REQ message to the MS in operation 930. The RNG-RSP message may include an ACK code indicating a TCP KeepAlive result for the MS. Response information indicating the TCP KeepAlive result is transmitted from the ASN-GW to the BS through the paging controller. If the ACK code is set to 0, this indicates successful reception of the response to the TCP KeepAlive packet transmission for the MS. Therefore, the MS resets the timer for TCP KeepAlive in response to the ACK code in operation 932.

While not shown, if the ASN-GW receives an RST packet in response to the TCP KeepAlive packet transmission, this implies that information about the TCP session is not valid any longer in the CN. Thus, the ACK code that the ASN-GW transmits to the MS is set to '1' and the MS releases (deletes) the TCP session in response to the ACK code.

If the ASN-GW receives an LU-REQ message including request information set to 0x02 through the BS, the ASN-GW transmits an RST packet to the CN in response to the request information on behalf of the MS. Then the CN terminates (deletes) the TCP session in response to the RST packet.

Figure 10:
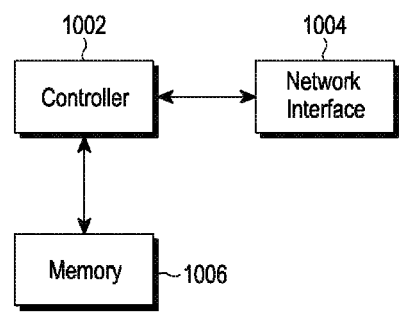
FIG. 10 is a block diagram of a network node according to an embodiment of the present disclosure.

FIG. 10 is a block diagram of a network node according to an embodiment of the present disclosure. The network node may be an ASN-GW that performs TCP KeepAlive on behalf of an MS.

Referring to FIG. 10, a network interface 1004 receives a TCP packet from a CN over a network. A controller 1002 detects that the TCP packet received from the network interface 1004 is a TCP KeepAlive packet and determines whether an MS being a destination of the TCP packet is in an idle mode based on state information about the MS stored in a memory 1006. If the MS is in the idle mode, the controller 1002 transmits an ACK packet for TCP KeepAlive to the CN through the network interface 1004. The controller 1002 notifies the MS of reception of the TCP KeepAlive packet by a paging procedure.

In another embodiment of the present disclosure, the controller 1002 receives an LU-REQ message requesting TCP KeepAlive from an MS through the network interface 1004 and transmits a TCP KeepAlive packet to a CN through the network interface 1004. Then upon receipt of an ACK packet for TCP KeepAlive from the CN through the network interface 1004, the controller 1002 notifies the MS of reception of the ACK packet by an LU-RSP message.

Figure 11:
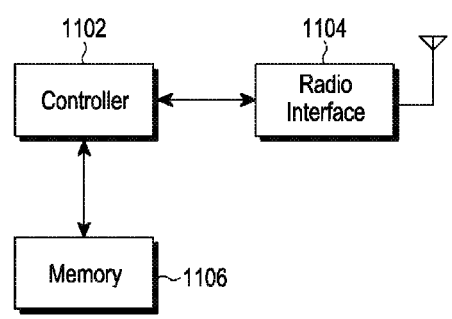
FIG. 11 is a block diagram of an MS according to an embodiment of the present disclosure.

FIG. 11 is a block diagram of an MS according to an embodiment of the present disclosure.

Referring to FIG. 11, a radio interface 1104 receives a paging message including indication information for TCP KeepAlive from a network node, ASN-GW through a BS. The indication information for TCP KeepAlive may then be stored in a memory 1106. A controller 1102 resets a timer for TCP KeepAlive in response to the indication information of the paging message received from the radio interface 1104. In another embodiment of the present disclosure, upon receipt of an LU-RSP message including indication information for TCP KeepAlive through the radio interface 1104, the controller 1102 resets the timer for TCP KeepAlive.

When the timer for TCP KeepAlive expires, the controller 1102 transmits an LU-REQ message including indication information for TCP KeepAlive through the radio interface 1104. Upon receipt of an LU-RSP message indicating a TCP KeepAlive result through the radio interface 1104, the controller 1102 may reset the timer for TCP KeepAlive.

The proposed method and apparatus for performing TCP communication in a wireless communication system may be implemented as computer-readable code in a non-transitory computer-readable recording medium. The non-transitory computer-readable recording medium may include any kind of recording device storing computer-readable data. Examples of the non-transitory computer-readable recording medium may include Read Only Memory (ROM), Random Access Memory (RAM), optical disk, magnetic tape, floppy disk, hard disk, non-volatile memory, and the like. In addition, the non-transitory computer-readable recording medium may be distributed over the computer systems connected over the network, and computer-readable codes may be stored and executed in a distributed manner.

While the present disclosure has been shown and described with reference to various embodiments thereof, it will be understood by those skilled in the art that various changes in form and details may be made therein without departing from the scope of the present disclosure as defined by the appended claims and their equivalents.

What is claimed is:

1. A method for performing Transmission Control Protocol (TCP) communication at a network node in a wireless communication system, the method comprising:

receiving, by the network node that connects between a Mobile Station (MS) and a data network, a TCP KeepAlive packet for maintaining a TCP connection established between a correspondent node and the MS through the data network from the correspondent node;

transmitting, by the network node, when it is determined that the MS is in an idle mode upon receiving the TCP KeepAlive packet, an acknowledgement packet in response to the TCP KeepAlive packet to the correspondent node; and transmitting, by the network node, indication information indicating the reception of the TCP KeepAlive packet to the MS.

2. The method of claim 1, wherein the indication information comprises an indication of a TCP KeepAlive packet arrival, an Internet Protocol (IP) address of the correspondent node, and a destination TCP port number.

3. The method of claim 1, wherein the indication information comprises an indication of a TCP KeepAlive packet arrival and a Service Flow Identifier (SFID) indicating a service flow related to the TCP connection.

4. The method of claim 1, wherein the indication information is transmitted to the MS through a paging request message.

5. The method of claim 1, wherein the indication information is transmitted to the MS through a location update response message.

6. The method of claim 1, further comprising:
transmitting, by the network node, a paging announce message including the indication information to a Base Station (BS);
transmitting, by the BS, a paging message including an action code indicating a location update request to the MS;
transmitting, by the MS, a location update request message to the BS; and
transmitting, by the BS, a location update response message including the indication information in response to the location update request message to the MS.

7. The method of claim 1, further comprising resetting a timer for TCP KeepAlive related to the TCP connection in response to the indication information by the MS.

8. A method for performing Transmission Control Protocol (TCP) communication at a network node in a wireless communication system, the method comprising:
receiving, by the network node that connects between a Mobile Station (MS) and a data network, a location update request message including indication information for TCP KeepAlive from the MS in an idle mode;
transmitting, by the network node, a TCP KeepAlive packet to a correspondent node that establishes a TCP connection with the MS through the data network in response to the indication information;
receiving, by the network node, a response to the TCP KeepAlive packet from the correspondent node; and
transmitting, by the network node, a location update response message including response information indicating a result of the transmission of the TCP KeepAlive packet to the MS.

9. The method of claim 8, wherein the indication information comprises an indication of a TCP KeepAlive packet arrival, an Internet Protocol (IP) address of the correspondent node, and a destination TCP port number.

10. The method of claim 8, wherein the indication information comprises an indication of a TCP KeepAlive packet arrival and a Service Flow Identifier (SFID) indicating a service flow related to the TCP connection.

11. The method of claim 8, wherein the location update request message further comprises request information requesting transmission of one of a TCP KeepAlive probe packet and a reset packet.

12. The method of claim 8, wherein the response information comprises an acknowledgement code indicating one of successful reception of an acknowledgement packet and reception of a reset packet in response to the TCP KeepAlive packet.

13. A method for performing Transmission Control Protocol (TCP) communication at a Mobile Station (MS) in a wireless communication system, the method comprising:
transmitting, by the MS, when a timer for TCP KeepAlive for a TCP connection established between the MS in an idle mode and a correspondent node through a data network expires, a location update request message including indication information for TCP KeepAlive to a network node that connects between the MS and the data network;
receiving, by the MS, a location update response message including response information indicating a TCP KeepAlive result from the network node; and
resetting, by the MS, when the response information indicates successful reception of an acknowledgement packet for TCP KeepAlive from the correspondent node at the network node, the timer for TCP KeepAlive.

14. The method of claim 13, wherein the indication information comprises an indication of a TCP KeepAlive packet arrival, an Internet Protocol (IP) address of the correspondent node, and a destination TCP port number.

15. The method of claim 13, wherein the indication information comprises an indication of a TCP KeepAlive packet arrival and a Service Flow Identifier (SFID) indicating a service flow related to the TCP connection.

16. The method of claim 13, wherein the location update request message further comprises request information requesting transmission of one of a TCP KeepAlive probe packet and a reset packet.

17. The method of claim 13, wherein the response information comprises an acknowledgement code indicating one of successful reception of an acknowledgement packet and reception of a reset packet in response to the TCP KeepAlive packet.

18. A network node for controlling a connection between a Mobile Station (MS) and a data network in a wireless communication system, the network node comprising:
a network interface configured to:
receive a Transmission Control Protocol (TCP) KeepAlive packet for maintaining a TCP connection established between a correspondent node and the MS through the data network from the correspondent node, and
transmit an acknowledgement packet in response to the TCP KeepAlive packet to the correspondence node; and
a controller configured to:
control, when it is determined that the MS is in an idle mode upon receiving the TCP KeepAlive packet, the network interface to transmit an acknowledgment packet in response to the TCP KeepAlive packet to the correspondent node, and
control the network interface to transmit indication information indicating the reception of the TCP KeepAlive packet to the MS.

19. The network node of claim 18, wherein the indication information comprises an indication of a TCP KeepAlive packet arrival, an Internet Protocol (IP) address of the correspondent node, and a destination TCP port number.

20. The network node of claim 18, wherein the indication information comprises an indication of a TCP KeepAlive packet arrival and a Service Flow Identifier (SFID) indicating a service flow related to the TCP connection.

21. The network node of claim 18, wherein the indication information is transmitted to the MS through a paging request message.

22. The network node of claim 18, wherein the indication information is transmitted to the MS through a location update response message.

23. The network node of claim 18,
wherein the network interface is further configured to transmit a paging announce message including the indication information to a Base Station (BS),
wherein the BS is configured to transmit a paging message including an action code indicating a location update request to the MS, wherein the MS is configured to transmit a location update request message to the BS, and wherein the BS is further configured to transmit a location update response message including the indication information in response to the location update request message to the MS.

24. The network node of claim 18, wherein the MS is configured to reset a timer for TCP KeepAlive related to the TCP connection in response to the indication information.

25. A network node for controlling a connection between a Mobile Station (MS) and a data network in a wireless communication system, the network node comprising:

a network interface configured to:

receive a location update request message including indication information for Transmission Control Protocol (TCP) KeepAlive from the MS in an idle mode, transmit a TCP KeepAlive packet to a correspondent node that establishes a TCP connection with the MS through the data network in response to the indication information, and receive a response to the TCP KeepAlive packet from the correspondent node; and a controller configured to control, upon receipt of a response to the TCP KeepAlive packet, the network interface to transmit a location update response message including response information indicating a result of the transmission of the TCP KeepAlive packet to the MS.

26. The network node of claim 25, wherein the indication information comprises an indication of a TCP KeepAlive packet arrival, an Internet Protocol (IP) address of the correspondent node, and a destination TCP port number.

27. The network node of claim 25, wherein the indication information comprises an indication of a TCP KeepAlive packet arrival and a Service Flow Identifier (SFID) indicating a service flow related to the TCP connection.

28. The network node of claim 25, wherein the location update request message further comprises request information requesting transmission of one of a TCP KeepAlive probe packet and a reset packet.

29. The network node of claim 25, wherein the response information comprises an acknowledgment code indicating one of successful reception of an acknowledgment packet and reception of a reset packet in response to the TCP KeepAlive packet.

30. A Mobile Station (MS) for performing Transmission Control Protocol (TCP) communication in a wireless communication system, the MS comprising:

a controller configured to generate, when a timer for TCP KeepAlive for a TCP connection established between the MS in an idle mode and a correspondent node through a data network expires, indication information for TCP KeepAlive; and a radio interface configured to:

transmit a location update request message including the indication information to a network node that controls a connection between the MS and the data network, and receive a location update response message including response information indicating a TCP KeepAlive result from the network node, wherein, when the response information indicates successful reception of an acknowledgement packet for TCP KeepAlive from the correspondent node at the network node, the controller is further configured to reset the timer for TCP KeepAlive.

31. The MS of claim 30, wherein the indication information comprises an indication of a TCP KeepAlive packet arrival, an Internet Protocol (IP) address of the correspondent node, and a destination TCP port number.

32. The MS of claim 30, wherein the indication information comprises an indication of a TCP KeepAlive packet arrival and a Service Flow Identifier (SFID) indicating a service flow related to the TCP connection.

33. The MS of claim 30, wherein the location update request message further comprises request information requesting transmission of one of a TCP KeepAlive probe packet and a reset packet.

34. The MS of claim 30, wherein the response information comprises an acknowledgment code indicating one of successful reception of an acknowledgment packet and reception of a reset packet in response to the TCP KeepAlive packet.

* * * * *